United States Patent
Theel et al.

(10) Patent No.: US 7,065,714 B1
(45) Date of Patent: Jun. 20, 2006

(54) GRAPHICAL USER INTERFACE FOR NAVIGATION, VIEWING AND MAINTENANCE OF RECIPES

(75) Inventors: Karen Theel, New Milford, CT (US); Eddie Oumerretane, Toulouse (FR); William G. Stearns, Katonah, NY (US); Brad Stoutimore, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 469 days.

(21) Appl. No.: 09/976,806

(22) Filed: Oct. 12, 2001

Related U.S. Application Data

(60) Provisional application No. 60/240,556, filed on Oct. 13, 2000.

(51) Int. Cl.
*G09G 5/00* (2006.01)

(52) U.S. Cl. ............... 715/781; 715/804; 715/810; 705/1

(58) Field of Classification Search ............... 345/853; 705/1, 15, 29; 715/538, 804, 781, 810
See application file for complete search history.

(56) References Cited

U.S. PATENT DOCUMENTS

| | | | | |
|---|---|---|---|---|
| 5,603,021 A | * | 2/1997 | Spencer et al. | 707/4 |
| 5,704,350 A | * | 1/1998 | Williams, III | 600/300 |
| 5,832,446 A | * | 11/1998 | Neuhaus | 705/1 |
| 6,097,016 A | * | 8/2000 | Hirata et al. | 219/720 |
| 6,281,900 B1 | * | 8/2001 | Ishikawa | 345/853 |

OTHER PUBLICATIONS http://www.allrecipe.com copyright 2000.*
http://web.archive.org/web/20000609155904/http://allrecipes.com/, publication date Jun., 2000.*

* cited by examiner

*Primary Examiner*—Cao (Kevin) Nguyen
*Assistant Examiner*—Ting Zhou

(57) ABSTRACT

A computer implemented enterprise resource planning system comprising a recipe database contained within computer readable media and a graphical user interface for navigation, viewing and maintenance of recipes is disclosed. The database links all elements of a recipe. A recipe navigator view displays recipe lists and other recipe information in a tree structure. A recipe summary view displays information on a recipe element indicated in the recipe navigator tree view. A recipe detail view is operable to edit components of a recipe element indicated in the recipe navigator tree view. Namely, the recipe detail view allows the editing of routings and formulas associated with a selected recipe.

42 Claims, 17 Drawing Sheets

Figure 10:
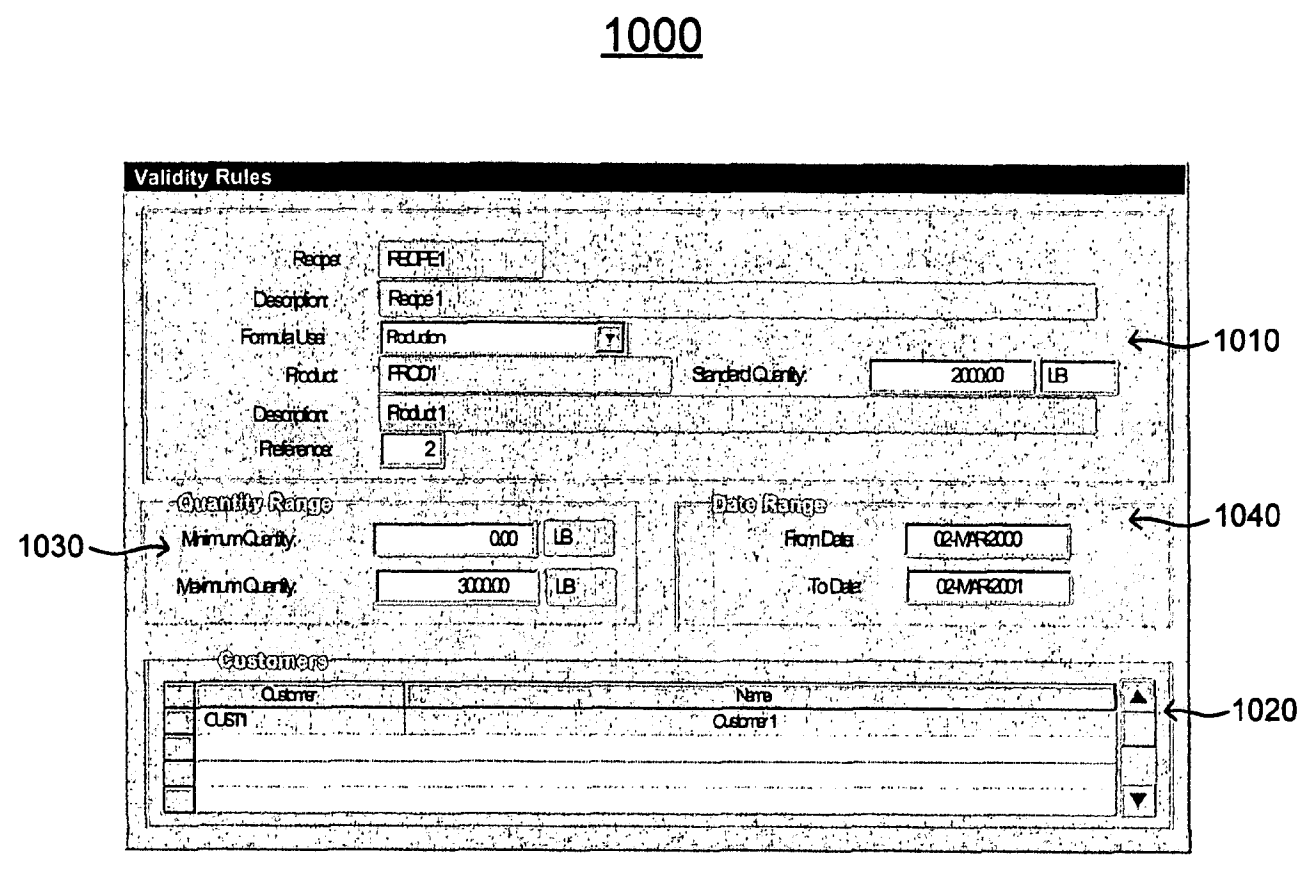

Validity Rules

— 1010

Recipe: RECIPE1
Description: Recipe1
Formula Use: Production
Product: PROD1
Description: Product1
Reference: 2

Standard Quantity: 20000 LB

Quantity Range — 1030

Minimum Quantity: 0.00 LB
Maximum Quantity: 30000.0 LB

Date Range — 1040

From Date: 02-MAR-2000
To Date: 02-MAR-2001

Customers — 1020

| Customer | Name |
|---|---|
| CUST1 | Customer1 |

Navigator For Formula
View By: Organization

- Formula By Organization
  - ORG1 (Organization 1)
    + LAB1 (Laboratory 1)
    + LAB2 (Laboratory 2)
    - LAB3 (Laboratory 3)
      - PROJECT1 (Project 1)
        - FORM1 (Formula 1)
          Production Use
          + Products
          + By-Products
          - Ingredients
            - (30.00 %) ING1 (30.00 LB), Ingredient 1
            - (40.00 %) ING2 (40.00 LB), Ingredient 2
            - (25.00 %) ING3 (25.00 LB), Ingredient 3
            - (05.00 %) INTER1 (5.00 LB), Intermediate 1
              - FORM-INTER1 (Formula for INTER1)
                + Products
                + By-Products
                + Ingredients
    + FORM2 (Formula 2)
    + FORM3 (Formula 3)
  + ORG2 (Organization 2)

200

Formula Summary — 1510

| Formula No: | FORM1 | Vers: | 1 | Status: | Approved |
|---|---|---|---|---|---|
| Description: | Formula 1 | | | | |
| Laboratory: | LAB3 | Laboratory 3 | | | |
| Main Product: | MAINPROD | Main product for formula FORM1 | | | |
| Quantity: | 100.00 LB | | | | |
| Owner: | FORMU1 | Formulator 1 | | | |

1520

| Line | Ingredient | Description | Quantity | UOM | Cont. % |
|---|---|---|---|---|---|
| 1 | ING1 | Ingredient 1 | 30.00 | LB | 30.00 |
| 2 | ING2 | Ingredient 2 | 40.00 | LB | 40.00 |
| 3 | ING3 | Ingredient 3 | 30.00 | LB | 30.00 |

Substitutes

Details — 1530

Summary  Validity Rules  Technical parameters

GRAPHICAL USER INTERFACE FOR NAVIGATION, VIEWING AND MAINTENANCE OF RECIPES

RELATED APPLICATION

This Application claims the benefit of U.S. Provisional Application Ser. No. 60/240,556, filed Oct. 13, 2000, which is hereby incorporated herein by reference in its entirety.

FIELD OF THE INVENTION

Embodiments of the present invention relate to data base management systems for use in Enterprise Resource Management (ERM). More particularly, embodiments of the present invention provide a method and apparatus providing a graphical user interface for navigation, viewing and maintenance of recipes.

BACKGROUND ART

The manufacture of virtually all products requires a sequence of processing steps, a variety of ingredients, specialized equipment and tools, as well as operating parameters for such tools and processes. The Instrument Society of America (ISA) has standardized the term "recipe" to refer to these items. Standard ISA-S88 defines recipe as: "an entity that contains the minimum set of information that uniquely defines the manufacturing requirements for a specific product." Recipes provide a way to describe products and how those products are produced. The standard, ISA-S88 is hereby incorporated herein as background material.

Consequently, for businesses involved in manufacturing, documentation and control of their recipes is critical to their success. Further, obtaining and collecting information about the manufacturing process, such as yield or throughput for a manufacturing stage, in order to improve utilization of materials or capital equipment, for example, can result in a critical competitive advantage.

Unfortunately, prior art systems for the management of recipes are primarily forms-based and typically do not automatically reflect the various levels of relationship between the many types of data. For example, the recipe might call for 100 kilograms of chemical "A." But in general, it would not be apparent to an observer that 11 minutes of time on machine "B" were required to utilize the chemical "A". While the requirement was presumably documented somewhere, the forms based management systems generally did not present such relationships to the users in easy to understand manners. Any such relationships between the types of data typically needed to be manually remembered by the user.

Further, there was no method of navigating among such relational linkages. Even if a user knew that some amount of time on some machine was necessary to process chemical "A," prior art recipe management software only provides cumbersome mechanisms to determine the specific requirements, especially if the starting point was the list of ingredients.

Because recipes are used to manufacture goods and perform industrial processes, the more efficient a recipe management system is, the more efficient is its overall manufacturing process, thereby saving expense and increasing quality.

SUMMARY OF THE INVENTION

A recipe management system that can display and navigate among such relationships between different types of information would be of great value to manufacturing companies. If such a recipe management system were further integrated into Enterprise Resource Planning (ERP) systems, such software would be highly advantageous.

Accordingly, it would be advantageous to provide a computer-controlled graphical user interface facilitating navigation, viewing and maintenance of recipes. A further need exists for a computer implemented enterprise resource planning system which combines routing, procedures and materials information, and automatically links this information together to window a recipe. A still further need exists for a method of determining the material requirements of a recipe based upon a common unit of measure for step quantity and charges.

A computer implemented enterprise resource planning system comprising a recipe database contained within computer readable media and a graphical user interface for navigation, viewing and maintenance of recipes is disclosed. The database links all elements of a recipe. A recipe navigator view displays recipe lists and other recipe information in a tree structure. A recipe summary view displays information on a recipe element indicated in the recipe navigator tree view. A recipe detail view is operable to edit components of a recipe element indicated in the recipe navigator tree view. Namely, the recipe detail view allows the editing of routings and formulas associated with a selected recipe.

Another embodiment of the present invention may include displaying a hierarchical tree format comprising project names, organization names, recipe names, formula names and routing names.

In one embodiment of the present invention, a routing editor window may be displayed.

In another embodiment of the present invention, a routing editor window may have a button that, when activated, displays a formula window corresponding to a selected item in a navigator tree view.

BRIEF DESCRIPTION OF THE DRAWINGS

FIG. 6 depicts a recipe maintenance window, according to an embodiment of the present invention, for routing editing of the selected recipe.

FIG. 7 depicts a recipe maintenance throughput window, according to an embodiment of the present invention, for routing throughput information.

FIG. 8 depicts a material and recipe operation window, according to an embodiment of the present invention, for formula information of the selected recipe.

FIG. 9 depicts a recipe validity rules selection window, according to an embodiment of the present invention.

FIG. 10 depicts a recipe validity rules maintenance window, according to an embodiment of the present invention.

FIG. 15 illustrates a formula summary window, according to an embodiment of the present invention.

FIG. 16 shows a formula detail window, according to an embodiment of the present invention.

DETAILED DESCRIPTION OF THE INVENTION

Figure 1:
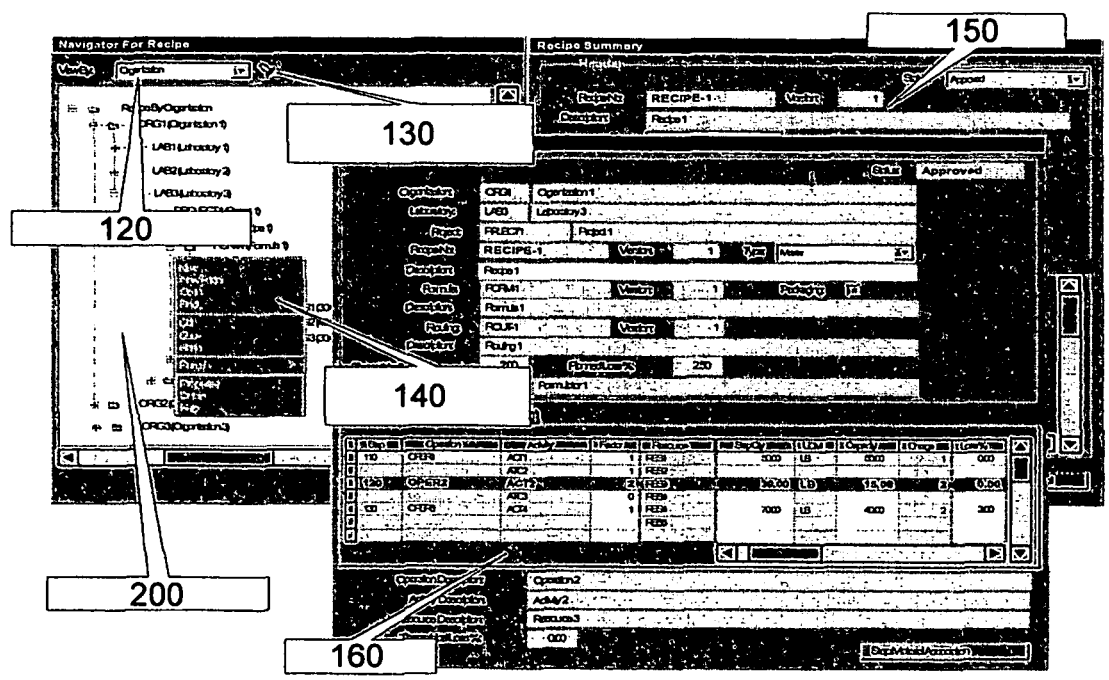
FIG. 1 illustrates display screen components or "windows" of a graphical user interface for recipe navigation, according to an embodiment of the present invention.

In the following detailed description of the present invention, graphical user interface facilitating navigation, viewing and maintenance of recipes, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., process 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the window of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "selecting" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Graphical User Interface for Navigation, Viewing and Maintenance of Recipes

Embodiments of the present invention are described in the context of Enterprise Resource Planning (ERP) systems. However, it is appreciated that the present invention may be utilized in other types of manufacturing systems where it may be necessary or convenient for a user to navigate, view and maintain recipes.

The Instrument Society of America (ISA) standard ISA-S88 describes recipe as: "an entity that contains the minimum set of information that uniquely defines the manufacturing requirements for a specific product." Recipes provide a way to describe products and how products are produced. Herein, recipes include data regarding ingredients, e.g., "formulas," and also include data regarding operations to be performed, e.g., "routings."

Figure 13:
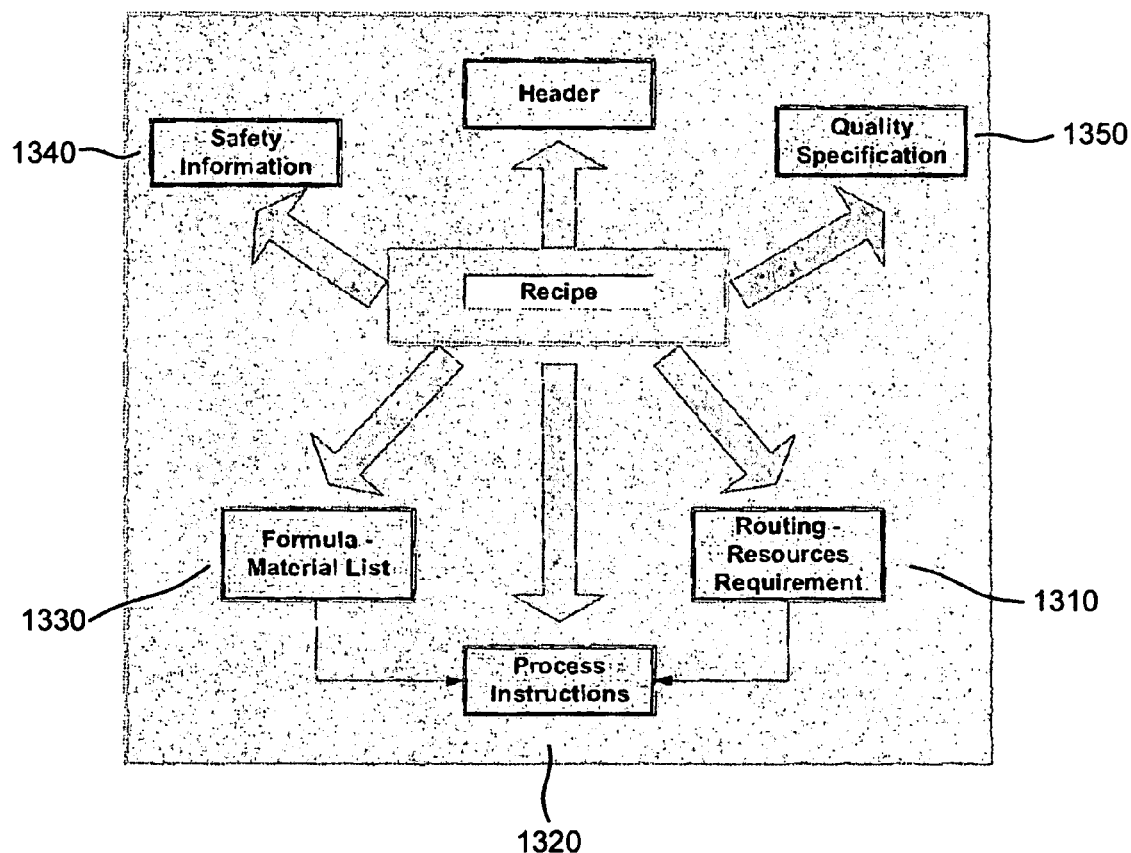
FIG. 13 shows a system overview of a structure of a recipe, according to an embodiment of the present invention.

FIG. 13 shows an overview of a structure of a recipe 1300, according to an embodiment of the present invention.

Recipe 1300 is an entity that combines process resources such as routing 1310 (equipment, labor, energy etc.), optional process instructions 1320 (procedures), materials 1330 (formulae), optional safety information 1340 and optional quality specifications 1350. Each of these elements may be managed separately and may be linked together in accordance with embodiments of the present invention to form a complete product repository (database) called a recipe.

The formula 1330 may be a required component of recipe 1300. Formula 1330 may specify process inputs (ingredients), process outputs (product, co-products and by-products) and process instructions (text combined with process parameters such as speed, temperature etc.) It may be maintained separately from recipes making reference to it. In other words a formula may be used by an unlimited number of recipes and any changes to a formula affect the recipes that are using (e.g., make reference to) it.

In accordance with embodiments of the present invention, several basic views of the material list may be provided. A first view gives a condensed list sequenced by operation steps, it describes the flow of material through the process. A second view may be the appropriate set of materials for the selected operation step.

Routing 1310 of FIG. 13 may encompass a sequenced set of operations that describe the process flow through a list of activities to be performed and the resources required to execute these activities. Functionality may be provided to display recipe operation steps dependencies with a graphical editor.

Optional process instructions 1320 may be a set of information that describes the procedure to be carried out at a particular operation step of the process. Process parameters such as speed, volume, maximum temperature, etc. may be specified ether for the whole operation step or for a specific operation step/ingredient combination.

Optional safety information 1340 may include regulatory information as an integrated component of recipe 1300. Access to regulatory information directly from the recipe may be available.

Optional quality specifications 1350 may define the manufacturing quality requirements, sample rates and test procedures associated with recipe 1300.

A unique validity rules record may be defined for a particular use (production, planning, etc.) against each product in a recipe when different recipes can be used based on the quantity to produce (min/max quantity range).

A unique validity rules record may also be defined when recipe use may be restricted by date (from/to date). When a recipe is expected to expire at a particular date, the user may set up future recipes with a start date that corresponds to the expiration date of the current valid recipe.

Further, a unique validity rules record may also be defined when multiple recipes for a particular use qualify given the quantity to produce and date. In this case a unique preference number must be defined.

Validity rules are primarily used to determine all levels of a recipe during the explosion process (costing, manufacturing resource planning, etc.) and to present a list of possible recipes to the user when creating a batch process.

With a recipe validity rules structure in place, the user can define different recipes for a particular product and determine under which condition each individual recipe can be used using Validity Rules. There can be more than one recipe defined for the same purpose. Further, the same recipe can be used for different purposes by associating multiple Validity Rules to it. There may be only one Validity Rules record per formula use.

FIG. 1 illustrates display screen components of a graphical user interface for recipe navigation 100, according to an embodiment of the present invention.

A portion of the display screen presents the Recipe Navigator Tree 200. Recipes and recipe components may be presented to the user in a hierarchical manner. The tree control offers a novel navigation paradigm allowing the user to navigate through data objects (recipes in this case) not forms. Any of the items in the tree structure 200 may be selected by a user, e.g., using a keyboard or a mouse and cursor. Selected items may have a displayed screen attribute indicating the selection. Additional functional display areas may be provided along with the navigator tree 200 as described below:

Screen area 120 may present a "view by" field. In this field, different views may be selected via menus, allowing the user to re organize the information in the tree.

Screen area 130 may present an icon tool by which a user may initiate a Search function. This feature provides the ability to search for recipes and file names in the database and save the results into a separate folder (personal or public).

Activating the right (or second) button on a mouse or other pointing device (or any other activation technique) may display a right mouse menu 140. The right mouse menu 140 may provide a contextual menu that gives access to standard functions such as help, cut, paste etc., and may also provide specific options based on the node selected in Recipe Navigator Tree 200. It is appreciated that some users (for example left-handed users) may invert the function of buttons on a pointing device. Embodiments of the present invention are well suited to such arrangements.

Screen area 150 may present a summary view. A summary view may be a specific window that displays the summary information of the object selected in the Recipe Navigator Tree 200. For instance, window 150 may display the name of a selected recipe, its formula name, a description of the recipe, the main product of the recipe, the quantity produced by the recipe, the formula used by the recipe, the routing used by the recipe, the type of the recipe and the status of the recipe, among other possible summary information.

Usually, a detail view 160 may be available for the object indicated in the summary view 150. The detail view 160 is described further below.

Figure 2:
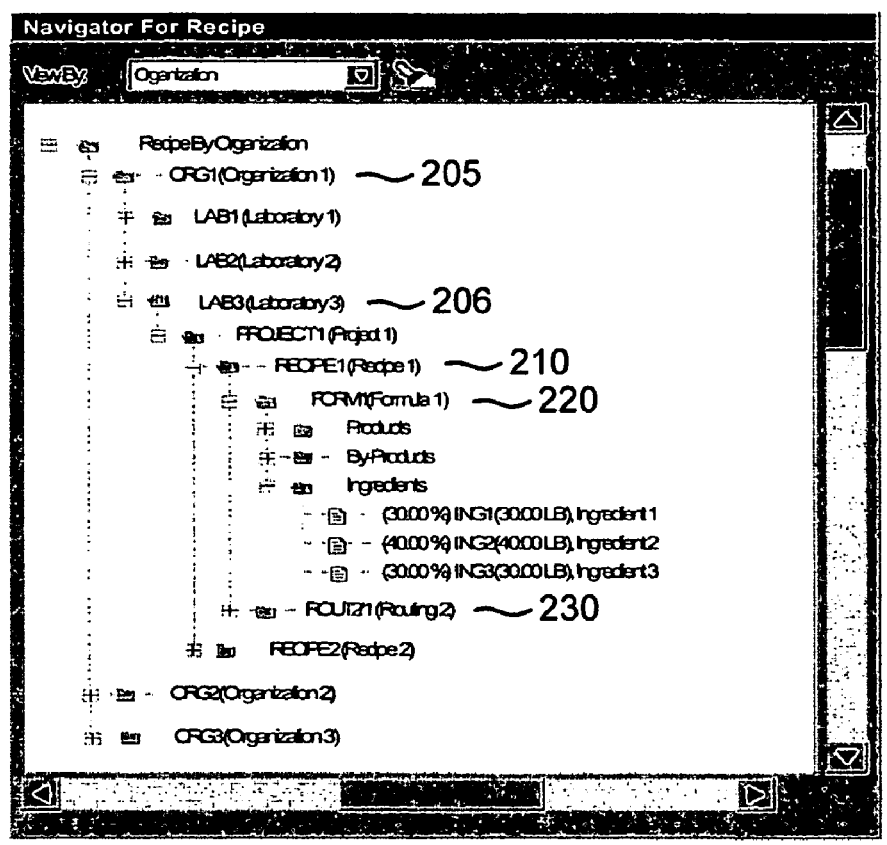
FIG. 2 illustrates a recipe navigator tree window, according to an embodiment of the present invention.

FIG. 2 further illustrates a recipe navigator tree window 200, according to an embodiment of the present invention. Any node in the navigator tree window 200 may be selected by the user.

The recipe navigator tree 200 may support many views. Supported views may include: view by organization, view by project, view by Laboratory, view by product, view by formula, view by product, view by status, view by owner, and view by type.

The information shown in the recipe navigator tree 200 may be based on a security level defined for the user. FIG. 2 shows the recipe navigator tree 200 organized by organization.

Still referring to FIG. 2, tree node 205 may be the name of the organization owning or controlling several recipes. Selecting this node may display all recipes controlled by the organization. There may be additional levels of organization beneath the organization node 205, for example lines of business or departments, or in this case laboratories, including the depicted "laboratory 3" node 206.

Selecting "laboratory 3" node 206 may display all recipes controlled by this level of organization. This level of organization may control several recipes, which may be used in a variety of projects.

Recipe node 210 represents all of the information needed to produce a specific product. When selected, this node may be expanded to display greater detail of the components, which may make up the recipe represented by recipe node 210. For example, recipe node 210 may comprise a formula 220 and routing 230.

In a similar fashion, formula 220, when selected, may expand to display additional detail, including for example the products which use recipe 210 in their formulation, a list of by-products produced by recipe 210 and a list of ingredients needed by recipe 210.

Routing 230 may include the processes and routing steps required to operate on the ingredients to conduct recipe 210. Routing 230 is shown in an unselected, unexpanded form. However, when selected, routing 230 may display details, including process steps and routing.

Figure 3:
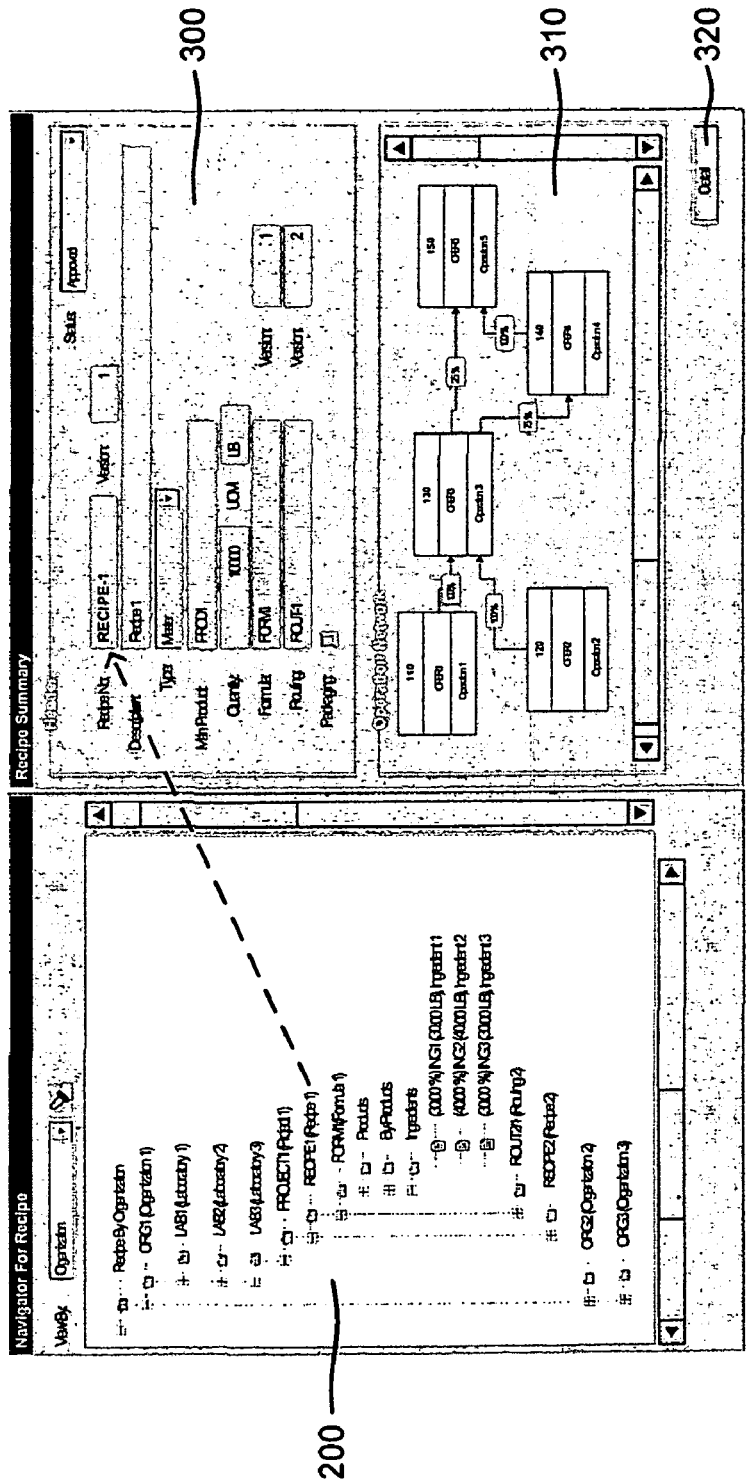
FIG. 3 depicts a recipe summary view window of a selected recipe, according to an embodiment of the present invention.

When the user selects a recipe node in the recipe navigator tree 200, the recipe summary view window 300 as shown in FIG. 3 may be displayed in view mode. From this screen, the user has the ability to create a new recipe or edit the current recipe by pressing the New or Edit buttons (not shown).

Recipe summary view window 300 may display summary information related to the recipe selected in recipe navigator tree window 200. Summary information may include the recipe name, a description of the recipe, the type of the recipe, a quantity of ingredients used in the recipe, a formula used by the recipe, a routing used by the recipe and the status of the recipe, among other possible summary information.

FIG. 3 also shows a routing flow summary window 310, which may be a graphical depiction of the routing flow indicated in the recipe summary view window 300. Routing flow summary window 310 may indicate sequence information and process yield information.

Routing flow summary window 310 may also include a detail button 320. When detail button 320 is selected, details of the routing indicated in routing summary screen window 310 may be displayed.

A formula summary window 1500 as shown in FIG. 15 may display when the user selects a formula node in the Navigator tree window 200. Formula summary header window 1510 may display summary information including the formula number and version, a description of the formula, information as to the organization that owns or controls the formula, a main product which uses the formula and the quantity of product produced by the formula.

The formula summary view may include ingredient list 1520. Ingredient list 1520 may include a list of all ingredients required in the selected formula, and may include the quantity and a description of the ingredient.

Figure 16:
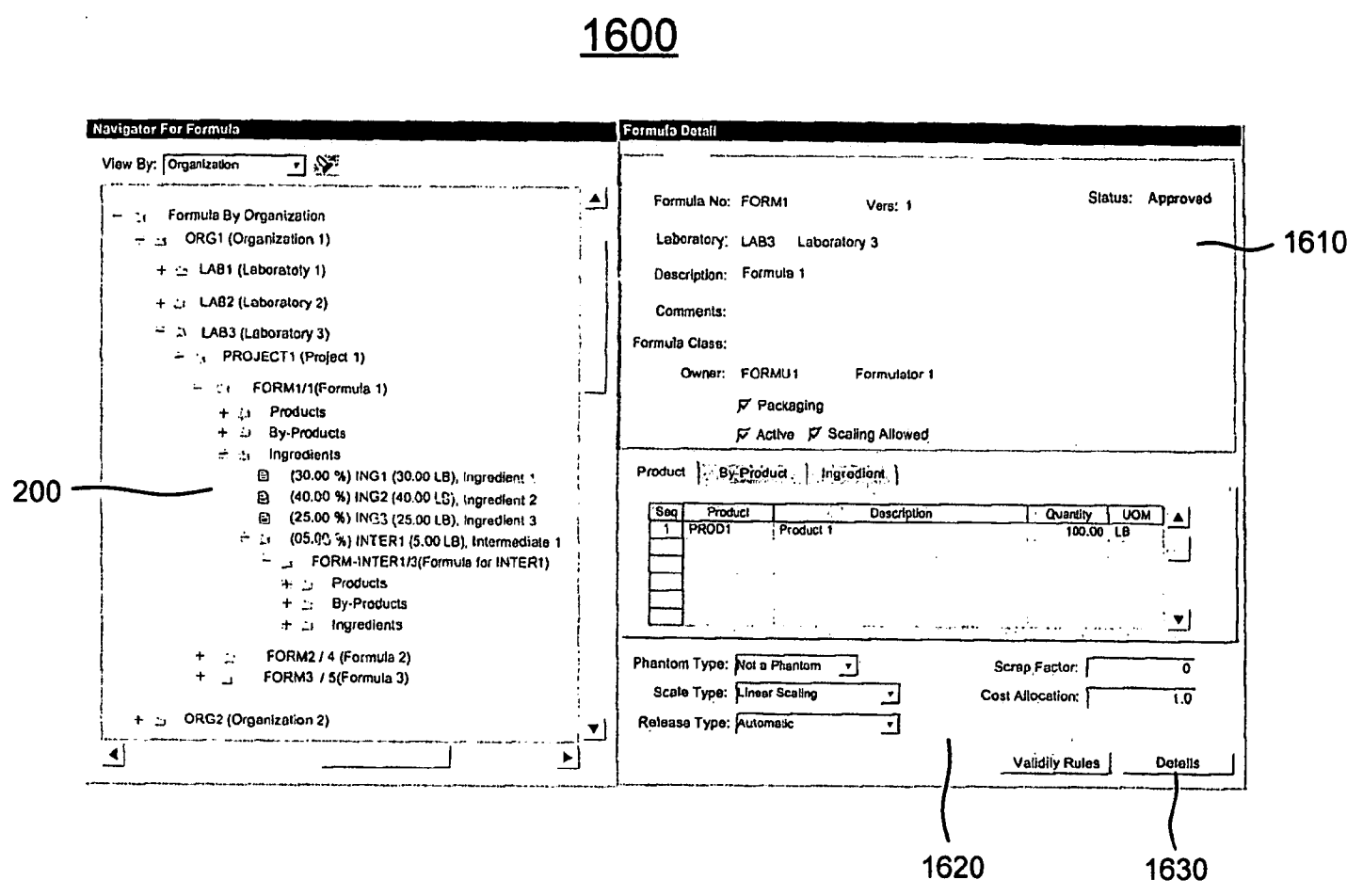

Still referring to FIG. 15, ingredient list 1520 may include several buttons or tabs. Details button 1530, when selected, may display a formula detail window 1600 (as shown in FIG. 16). Technical parameters selection tab 1540, when selected, may display the technical parameters, for example required purity, of the selected formula. Validity rules selection tab 1550, when selected, may display the validity rules related to the selected formula.

FIG. 16 shows a formula detail window 1600, according to an embodiment of the present invention. Formula detail window 1600 may display when the user selects a formula node in the Navigator tree, when the user presses the details button 1530 from the formula summary window or by selecting the open option (right mouse menu 140, the edit menu or from the toolbar).

Formula detail window 1600 may include formula detail header 1610 that displays detail information about a selected formula and allows editing of such information. Detail information may include a formula name and version, a laboratory name and description, comments, formula class, owner and indicators for packaging, whether the formula is active, whether scaling is allowed and the status of the formula.

Formula detail window 1600 may include a formula components window 1620. Formula components window 1620 may list the products that use (reference) the selected formula, the by-products produced by the selected formula and the details of an ingredient used in the selected formula.

As shown in FIG. 16, formula detail window 1600 may also include a details button 1630 that, when selected, may provide further details on a selected component, for example a specific product that uses the selected formula.

Figure 17:
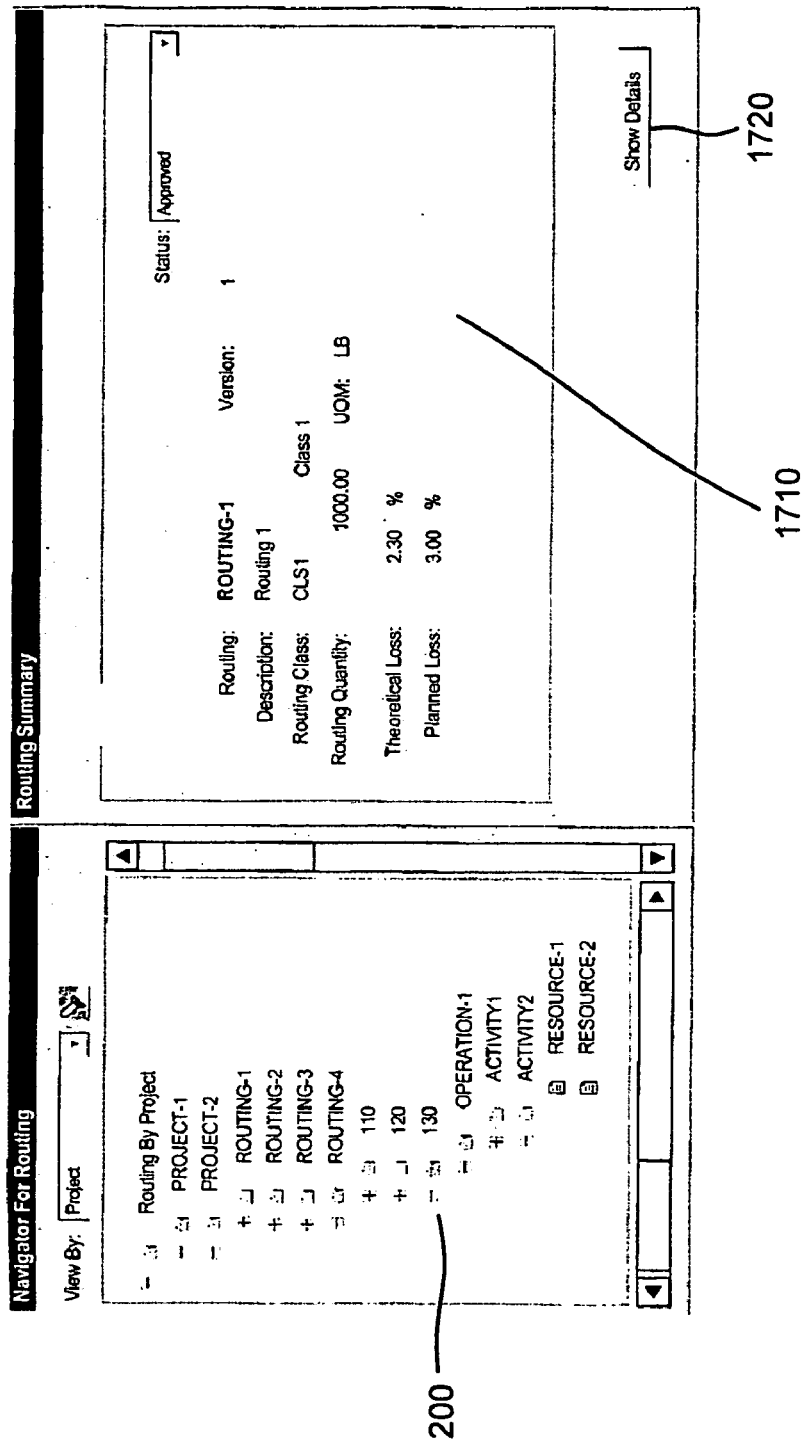
FIG. 17 shows a routing summary window, according to an embodiment of the present invention.

FIG. 17 shows a routing summary window 1700, according to an embodiment of the present invention. Routing summary window 1700 may display when the user selects a routing node in the Navigator tree. Routing summary header window 1710 may display a variety of summary information describing a routing, including the name and version number of the routing, a description of the routing, the class of the routing, the quantity of product produced by the routing, theoretical loss of the planned routing and planned loss of the routing.

Routing summary window 1700 may also have a "show details" button 1720 that, when selected, may display a routing detail window (not shown).

A routing detail window (not shown) may display when the user selects a routing node in the Navigator tree, when the user presses the detail button 320 from the Routing Summary window or by selecting the Open option (right mouse menu/edit menu/toolbar). In a manner similar to the other detail windows, the routing detail window may provide a user with further details of routing information, and the ability to edit routing information.

Figure 4:
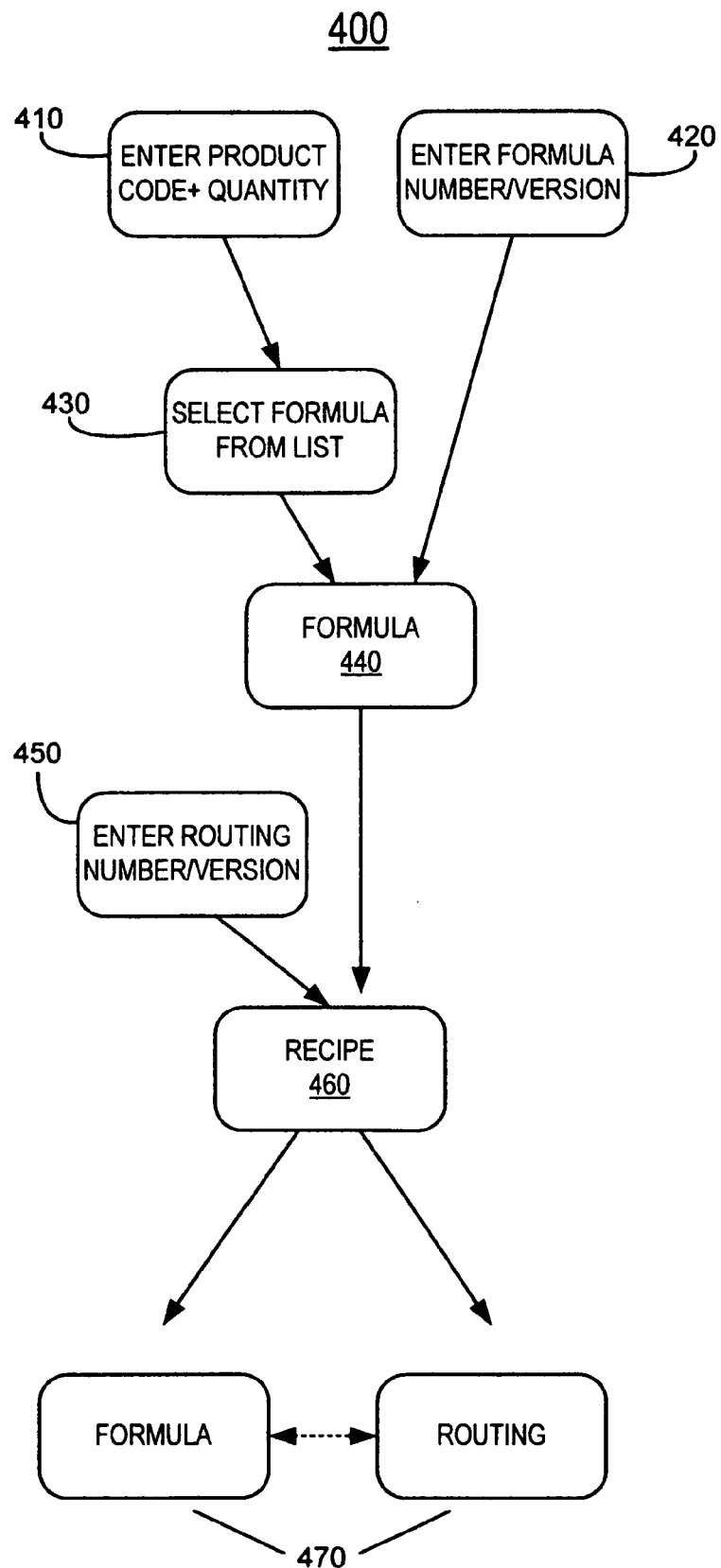
FIG. 4 shows a flow diagram of a recipe creation process, according to embodiments of the present invention.

FIG. 4 shows a computer implemented exemplary recipe creation process 400, according to embodiments of the present invention. Process 400 is realized by computer code executed on a processor of a computer system.

To create a recipe, a user may have the option to specify the product code and quantity in step 410 or the formula number/version in step 420.

If the user enters the product code and product quantity, embodiments of the present invention may displays a list of all effective formulas (if more than one exists). The user may select the one he/she wants to use to create the recipe in step 430.

In step 440, the formula is determined.

Optionally, the user has the ability to specify the routing that will be used for the recipe definition in step 450.

In step 460, routing attributes (min/max capacity, activity factor, charges and resource usage) may be inherited and may be overridden. Further, formula validity rules may be inherited and may be overridden in this step.

In step 470, if the routing is setup for automatic step calculation, the user may associate the formula material to the appropriate routing steps in step. Quantities and charges may be automatically calculated for each process step in step 470.

Process instructions may also be defined for each stage of the process in step 470. Further, in step 470, throughput (process quantity and usage) may be overridden based on ingredient characteristics.

Figure 5:
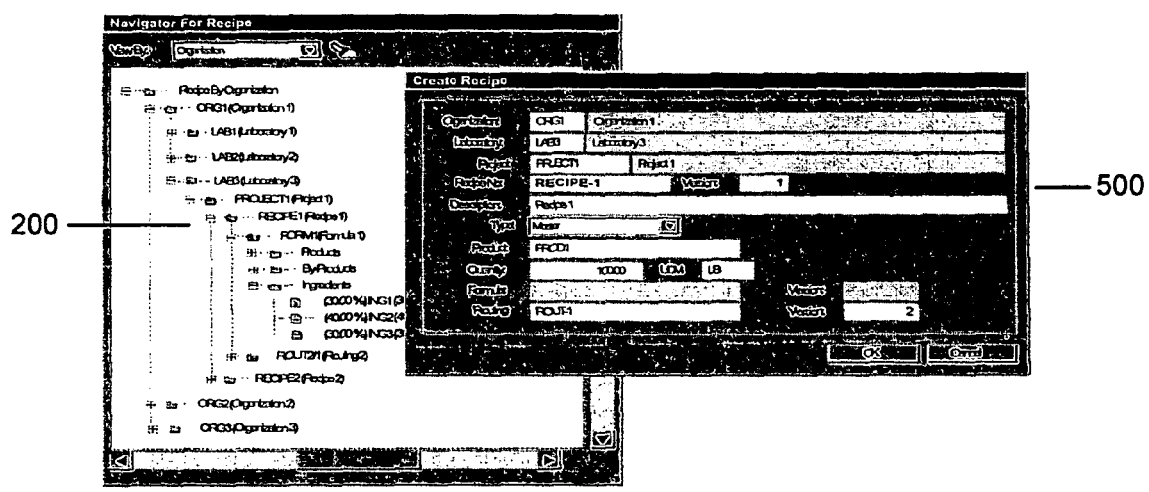
FIG. 5 depicts a recipe creation window, according to an embodiment of the present invention.

FIG. 5 depicts an exemplary recipe creation window 500, according to an embodiment of the present invention. The recipe creation window 500 may display when the user selects the New option available from the right mouse menu 140, the Toolbar, the Edit menu and from the recipe summary window 300 as well as the Recipe Detail window (not shown). This may prompt the user to enter administrative information (organization, laboratory, project, recipe number, version, description and type) and to identify the formula and routing to be used in the recipe.

If the user enters a product number, the user may be required to enter the product quantity as well. The formula number/versions may be protected against data entry. If more that one effective formula is located (based on formula validity rules), a list showing all valid formulas displays. The user must select one formula from this list prior to proceeding with the recipe creation process.

If the user entered a product number, the formula number/version field may be protected against data entry. Otherwise, the user may be prompted to enter a valid formula number/version. It may not be mandatory to specify a routing for creating a recipe. Note that only routings that have a type compatible with the recipe type may be accepted.

Figure 6:
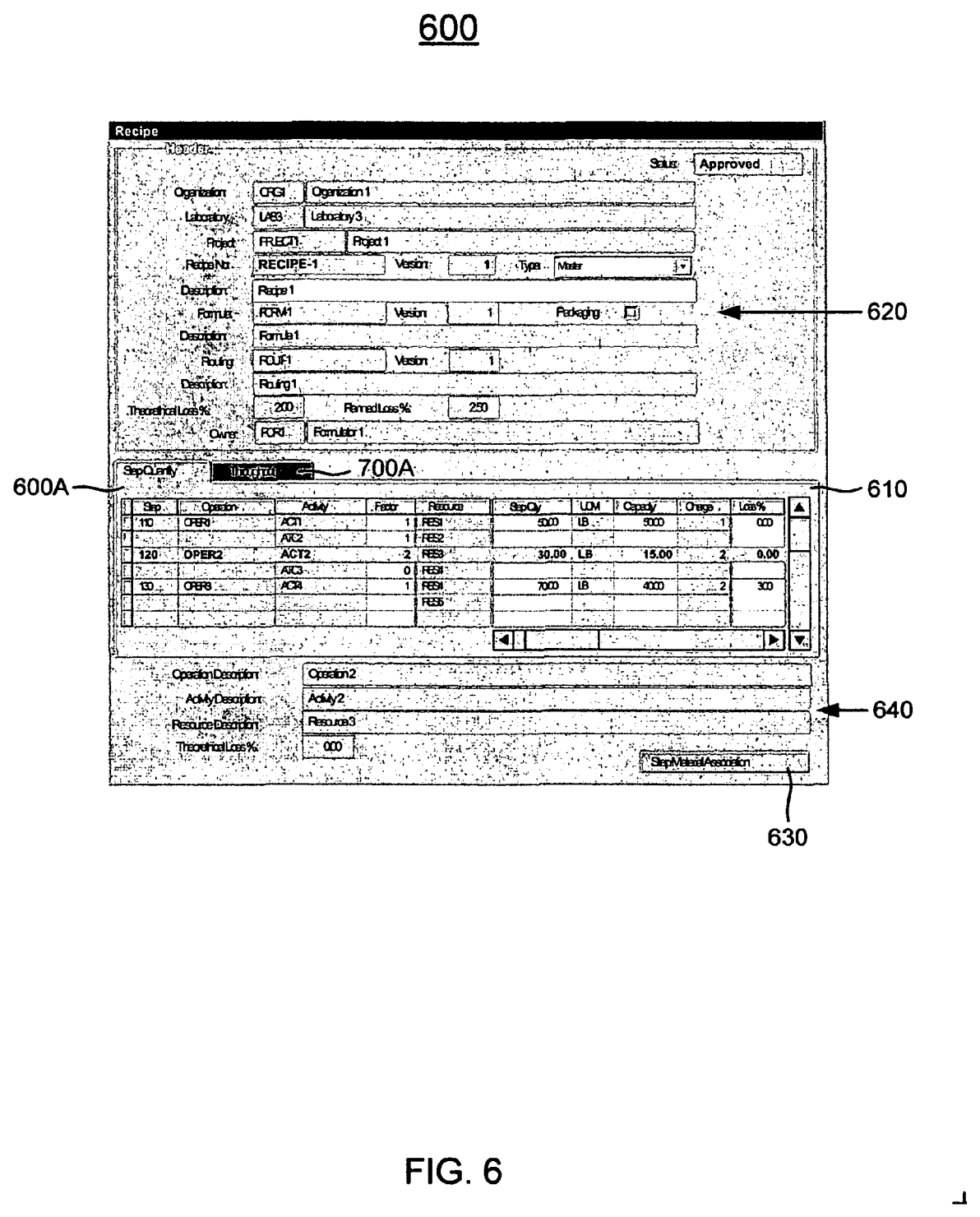

FIG. 6 depicts a recipe maintenance window 600 for editing a routing, according to an embodiment of the present invention. Recipe window 600 may display when the user selects a recipe node or presses a detail button 320 from the recipe summary display. Window 600 may be activated based on a user selection of tab 600a.

Recipe maintenance window 600 may include a step quantity window 610 that contains line items relating to operations that are defined for the routing. As described further below, many fields may be defined for each line item, such as operation name, activity, Factor, resource, quantity, etc.

Recipe maintenance window 600 may further include recipe header window 620. Recipe header window may display various items defined for a recipe, including organization, laboratory, project, recipe number, version and type, a description of the recipe, a formula used in the selected recipe, a routing used in a recipe, theoretical and predicted losses and an owner of the selected recipe.

Several types of information in the recipe header window 620 may be edited by the user. A recipe description may be edited by the user. The user may also edit the recipe owner field. This may be the actual owner of the recipe. This field may default to the user creating the recipe and can be overridden. If overridden, an alert may be sent to notify the owner.

The step quantity window 610 may display when the user selects a recipe node or presses the Detail button 320 from the recipe summary window 300.

Still referring to FIG. 6, recipe maintenance window 600 may further include expansion display 640 which displays greater detail of an item selected in step quantity window 610.

Recipe maintenance window 600 may further include a step material association button 630 that, when activated, allows a user to edit the relationships between process steps and the materials associated with those process steps.

Embodiments of the present invention may support definition and maintenance of material loss during the production process at both operation step and routing levels.

If an option to account for process loss at operation level is enabled, the routing process loss shows the rolled up value derived from operations and editing may be prevented.

If the option to maintain process loss at routing level is enabled, the planned process loss defaults from the theoretical process loss upon recipe creation. This may be changed within a pre-defined tolerance factor, for example:

Routing Planned Process Loss>Routing Theoretical
Process Loss*(1−Tolerance %) AND Routing
Planned Process Loss<Routing Theoretical Process Loss*(1+Tolerance %)

where Routing Theoretical Process Loss may be a calculated value based on the recipe quantity and recipe group.

If a change to the recipe or step quantities entails a different theoretical process loss, the planned process loss defaults to the new theoretical value and a warning message may display to indicate to the user that the planned process loss has changed.

Still referring to FIG. 6, several different information entries may be edited from the recipe step quantity window 610.

One such entry is Activity Factor. The concept of factor is the number of times an activity is performed. For example, a quality test may be performed at the beginning, middle and end of a mixing time period. Rather than defining the activity and associated resources three times as was required in the prior art, this new attribute may be used as a multiplier to indicate several iterations of the same activity. In the previous example, the engineer would define a factor of three against the activity test.

Factors may be inherited from the routing and can be overridden. They can be set to zero to exclude a particular activity. This may also be a mechanism to select the resources (equipment, labor, etc.) used for this production run within this specific plant.

This new attribute applies to resource usage when planning and calculating resource costs.

Another editable quantity is Step Quantity. Depending on the routing configuration, step quantities can manually be maintained by the user or calculated by the system.

If step quantities are manually maintained, upon recipe creation, step quantities default from the routing and can be overridden. Changing the step quantity may involve re calculation of charges and operation process loss which in turns triggers the re-calculation of the overall routing process loss.

A third editable quantity is capacity. Capacity constraints may be maintained at three or more different levels, including Resource, Activity and Operation.

By defining the level at which the capacity constraint is tracked, users may implicitly designate the component to which the number of charges applies. Capacity defaults from the routing upon recipe creation and can be overridden. Changing capacity may involve a change in the number of times (charges) this component (Resource, Activity or Operation) may be executed.

Recipe maintenance step quantity window 610 shows that the system has been setup so that capacity limitation is tracked and recorded at operation level.

Upon creation of a recipe, the operation planned process loss may default from the theoretical one. This may be changed within a pre-defined tolerance factor, for example:

Operational Planned Process Loss>Operational Theoretical Process Loss*(1−Tolerance %) AND
Operational Planned Process Loss<Operational Theoretical Process Loss*(1+Tolerance %)

where Operation Theoretical Process Loss is a calculated value based on the operation step quantity and operation class.

If a change to the recipe or step quantities entails a different theoretical process loss, the planned process loss may default to the new theoretical value and a warning message may display to indicate to the user that the planned process loss has changed.

Figure 7:
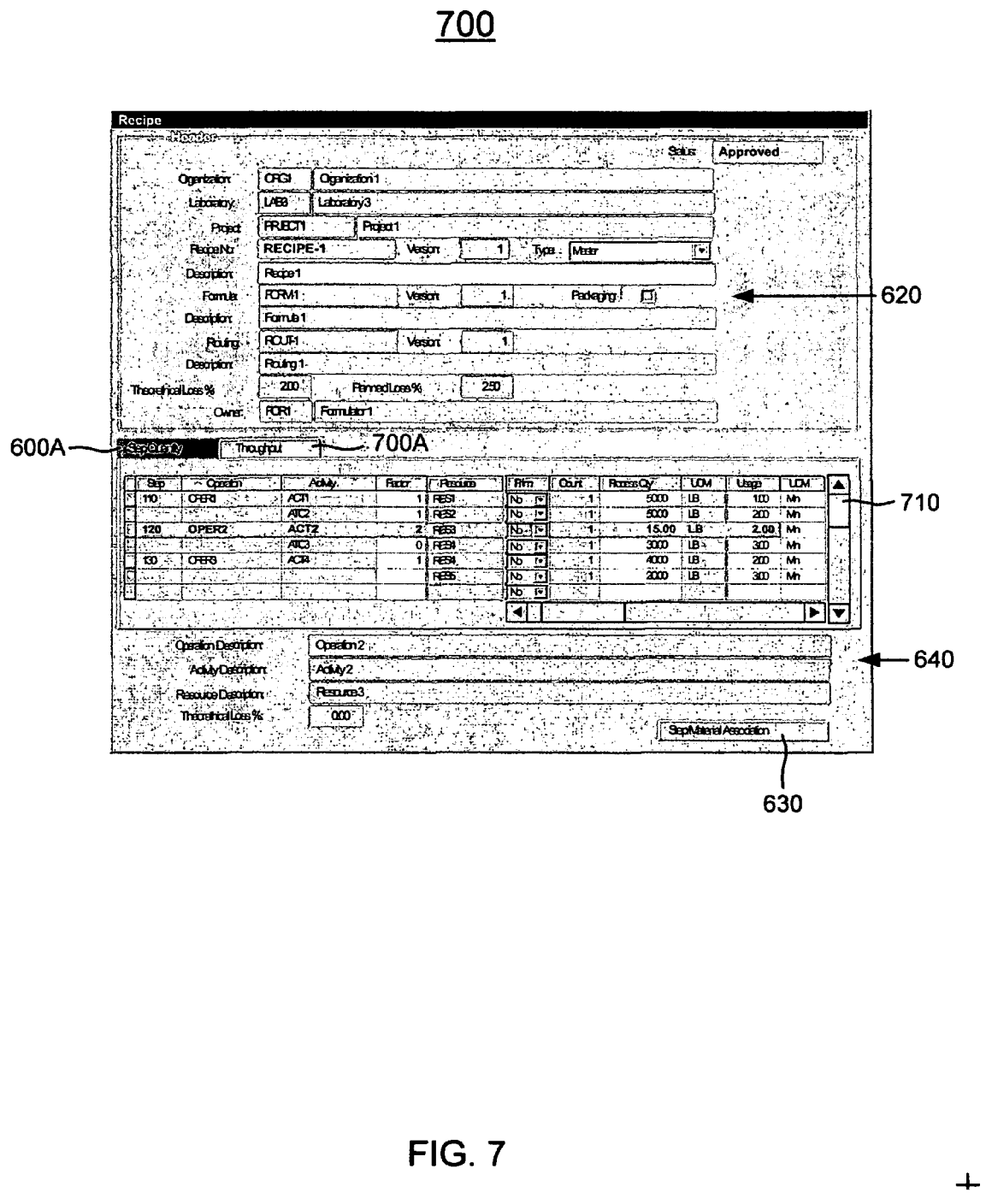

FIG. 7 depicts a recipe maintenance throughput window 700, according to an embodiment of the present invention. The recipe maintenance throughput window 700 may display when the user selects a recipe node or selects the Detail button 310 from the recipe summary window 300 or selects tab 700a.

Recipe maintenance throughput window 700 may include throughput editor window 710 that contains line items relating to resources that are defined for throughput. As described further below, many fields may be defined for each line, including a count, process quantity, units of measure, and usage (consumption).

From throughput editor window 710, users may override default resource use rates previously setup at the operation level. This feature may eliminate the need to have a unique operation and a unique routing whenever the throughput changes due to material variability in terms of chemical characteristics such as viscosity. The user may setup default operations and routings with average material throughput, yet indicate material specific flows at the recipe level.

The throughput editor window 710 provides a mechanism to amend process and usage quantities as well as factors. This information is presented in a manner consistent with the line items from window 600. For instance, in window 710 are displayed the line items with throughput data.

The process quantity and usage for each activity and resource combination may default from the operations. Changes may be permitted to accommodate throughput variability due to material viscosity for example. Process quantity, usage information and resource combination are displayed according to the line item structure.

A user may configure a recipe so that it describes the operation steps involved in a production process, allocates resources and materials to the process.

The link of materials to recipe operation steps is not mandatory since the recipe model does not require a routing to be used for specifying processing requirements and embodiments of the present invention may authorizes step quantities to be manually entered by the operator.

Nevertheless, this association may be a prerequisite for automatic step quantity calculation and material consumption management at step level in production execution (Process Operation Control).

Figure 8:
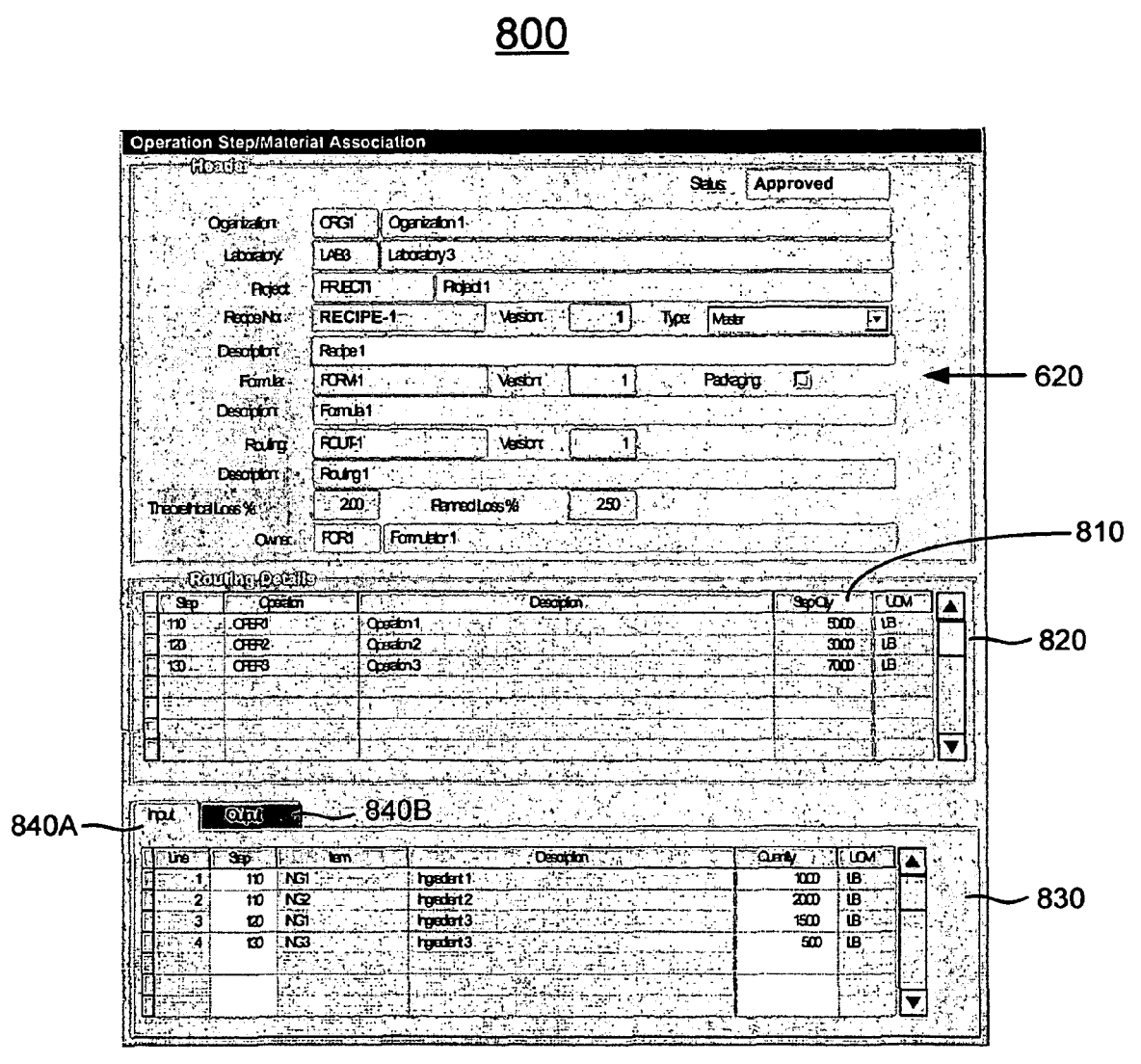

FIG. 8 depicts a material and recipe operation window 800, according to an embodiment of the present invention. Material and recipe operation step association window 800 may be accessible from the Recipe Maintenance forms (600, 700) via selecting button 630.

Material and recipe operation window 800 is used to display formula information related to the step that is currently selected in either window 600 or window 700.

Material and recipe operation window 800 may contain a routing details window 820 that displays detailed information on a routing selected in window 620.

The step quantity field 810 in the Routing Details window 820 may be configured to only display if embodiments of the present invention have been setup to manually maintain step quantities. If embodiments of the present invention have been setup to automatically calculate step quantities, the step quantity field may be hidden.

Upon entry to material and recipe operation window 800, the Routing Details window 820 may be automatically populated. If the window is in creation mode, the Formula Details window (1600 in FIG. 16) may be populated with the formula details. Otherwise, the step/material association data may be retrieved from the database.

If a particular ingredient is used by different operations, the user may have the ability to create new formula lines for this ingredient in order to associate them to the appropriate operation steps. In doing so, embodiments of the present invention may check that the overall quantity of ingredients has not changed to ensure that the total composition by item has not been modified for the formula. If so, embodiments of the present invention may not allow the recipe to be saved, and may issue an error message substantially similar to "The ratio of items in the formula cannot be altered".

The formula redistribution process may be subject to change management.

Still referring to FIG. 800, material and recipe operation window 800 may include materials input window 830. Materials input window 830 may be displayed in response to the selection of input tab 840a. Materials input window 830 may display and allow a user to edit details of the ingredients used as inputs to the selected routing operation.

Material and recipe operation window 800 may further include an output tab 840b. When output tab 840b is selected, a materials output window (not shown) may display and allow a user to edit details of the ingredients produced as outputs from the selected routing operation.

The material quantity calculation may determine how much material is to be processed by each routing step, taking into consideration the routing step dependencies and the materials (input/output) associated to each step. Subsequently, this may be used to establish the number of charges required to satisfy the demand based on the maximum capacity of the selected process element (resource, activity or operation step). If the quantity of a material is changed, embodiments of the present invention may recalculate all dependent quantities in the recipe.

An option may be available at routing level to indicate whether step quantities are manually maintained or automatically calculated by the system. The prerequisites of step quantity calculation are the creation of step dependencies and the association of material to each appropriate step.

Embodiments of the present invention may use a common pre-defined unit of measure for the step quantity and charges calculation process. This approach provides better efficiency from a performance standpoint and also reduces the unit of measure setup overhead when compared to using different units of measure for some or all step quantities.

Figure 9:
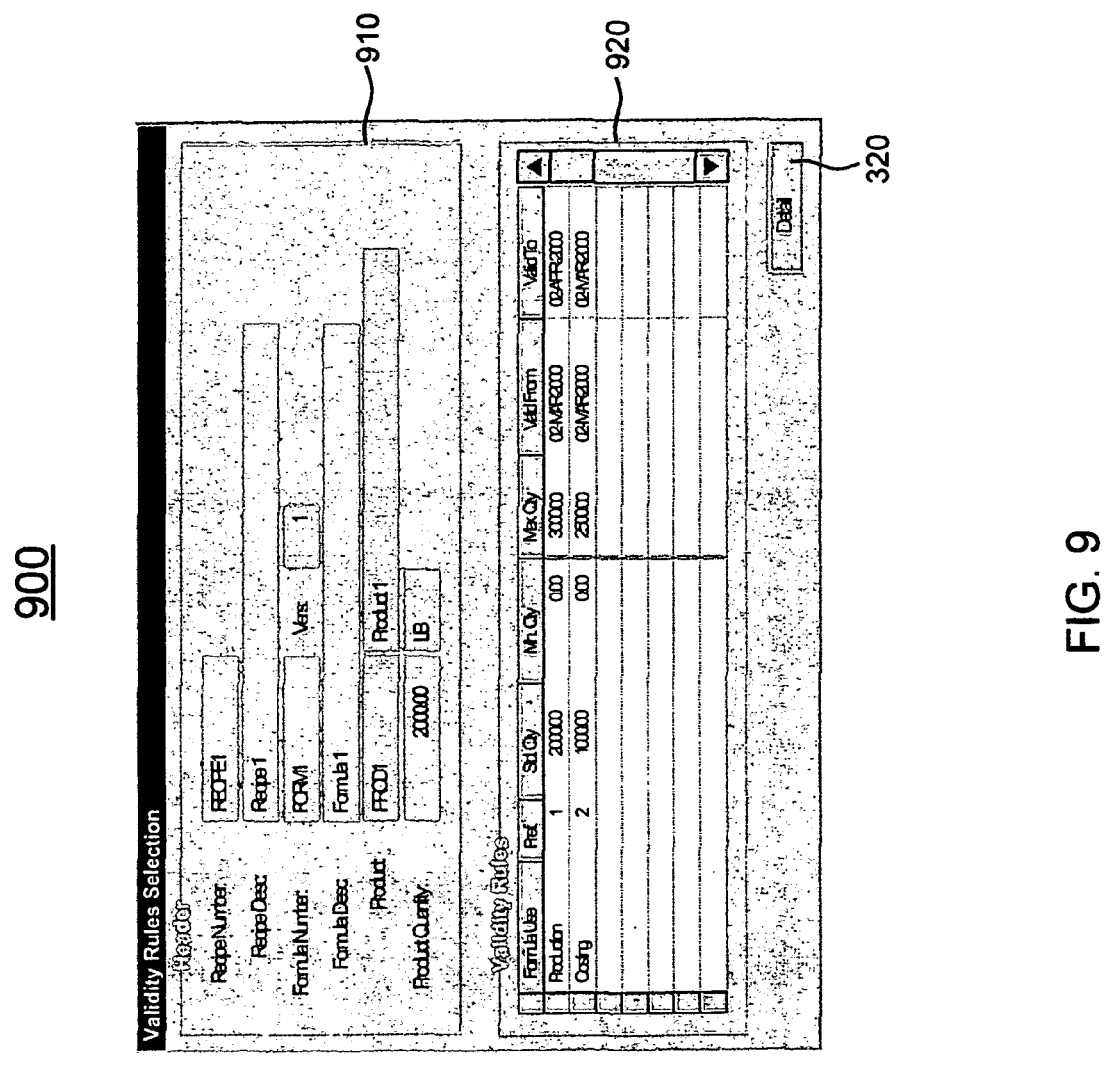

FIG. 9 depicts a Recipe Validity Rules Selection window 900, according to an embodiment of the present invention.

Recipe Validity Rules Selection window 900 may include a header window 910 which may display information about the selected recipe, for example, the recipe name, the formula name and version, a description of the formula, the quantity produced and a product that uses this recipe.

Recipe Validity Rules Selection window 900 may further include a validity rules editor window 920 which allows a user to edit various validity rules as they relate to the indicated recipe, formula and product.

Recipe Validity Rules Selection window 900 may display whenever the user chooses the option to edit validity rules for a particular product in a recipe. For example, this window may be accessible from the right mouse menu 140 when the user selects a product in the recipe navigator tree 200. Note that this window may only be displayed if there is more than one validity rule for the selected product. Otherwise, the recipe Validity Rules Maintenance window 1000 may be displayed.

FIG. 10 depicts a Recipe Validity Rules Maintenance window 1000, according to an embodiment of the present invention. This window may be displayed when the user presses the detail button 320 from Recipe Validity Rules Selection window 900 or when the Validity Rules option is selected for a product that has only one validity rule defined.

Recipe validity rules maintenance window 1000 may include a recipe identification window 1010 that displays information about the selected recipe, including the recipe name and description, and a product name and description.

Recipe identification window 1010 may further include editable fields for displaying or changing the use of a formula, displaying or changing a standard quantity and displaying or changing a preference associated with the selected recipe.

Still referring to FIG. 10, recipe validity rules maintenance window 1000 may further include a quantity range window 1030 that contains fields for displaying or editing minimum and maximum quantities of product to be produced. Recipe validity rules maintenance window 1000 may also include date range window 1040 that contains fields for displaying or editing a from data and a to date to indicate a date range for which the selected recipe is valid.

Recipe validity rules maintenance window 1000 may further contain a customers window 1020 that lists and allows a user to edit customers for the product. It is appreciated that customers is used in a broad sense, and may include any consumer of the identified product, from external "paying" customers to internal users to subsequent process steps.

Upon recipe creation, Validity Rules for the recipe may be automatically created. The attributes may default to either the formula or the routing entered by the user.

The Preference list is used to determine the preferred recipe in case of conflict. Defaults may be obtained from formula and may be overridden. The Formula Use defines the purpose for which this recipe can be used (Production, Costing, Planning etc.) Defaults may be obtained from formula and cannot be overridden.

The user may specify a Standard Quantity. Defaults may be obtained from formula and can be overridden. It may fall within the minimum and maximum date range.

The user may specify a Min/Max Quantity. These values may determine the minimum and maximum quantity that this recipe can be used. Values may be derived as explained below:

If only formula is entered at the recipe creation time, minimum and maximum quantities may default from the formula. Values can be overridden and must fall under the quantity range defined for the formula for this formula use.

If both formula and routing are specified, the quantity range may default to the most restrictive values.

A user may specify From/To Date. This may define the dates on which this recipe will go into effect (From date) and after which this recipe will no longer be in effect (To date). The same logic as per discussed above for Min/Max Quantity may apply.

Note that the user may delete a particular Validity Rule that has been automatically generated but cannot add Validity Rules for a formula use that has not been defined at formula level.

A recipe is an entity that describes the production procedure for one or many products (co-products).

Because different parts of an enterprise may need information about the manufacture of a product in varying degrees of specificity, embodiments of the present invention may provide the ability to specify a recipe with the information that is appropriate for its specific purpose. For example in accordance with ISA S88.01 "General" recipes are recipes that are created at the enterprise level to provide a "global" view of the manufacture of a product. There is no specific reference to the equipment available at a particular site. Recipe Type is a user-defined attribute that allows identification of the purpose of a recipe.

Depending on the company requirements, different categories of recipes may exist. In defining types, users can indicate if this type of recipe can be used for production. For example, if the enterprise decides to implement ISA S88.01 standards, a recipe type "Master" will be created and the "Production use" indicator is checked as shown in recipe type maintenance window 1100 in FIG. 11, according to an embodiment of the present invention.

Recipe type maintenance window 1100 may include type window 1110 that displays a list of recipe types and descriptions. A user may select a type for the selected recipe.

Figure 11:
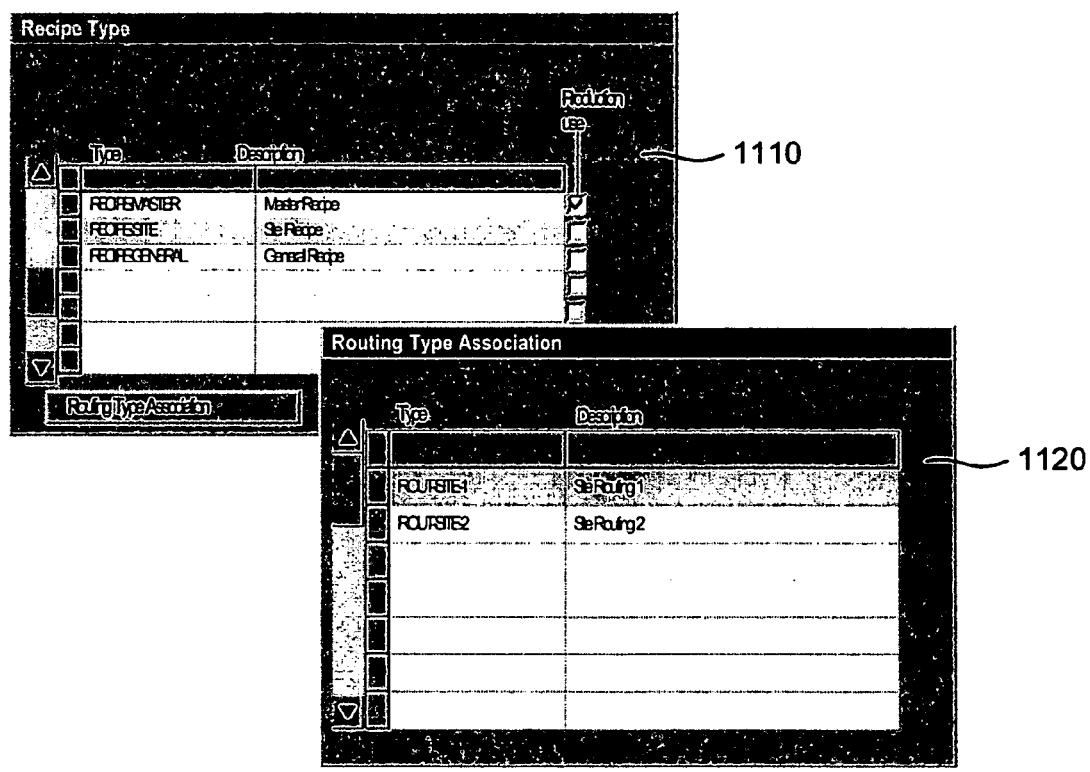
FIG. 11 illustrates a recipe type maintenance window, according to an embodiment of the present invention.

Recipe type maintenance window 1100 may further include routing type association window 1120 as shown in FIG. 11. Routing type association window 1120 allows a user to associate routings and recipe types.

Embodiments of the present invention may give the user the ability to define which routing type can be used to build a particular recipe. Based on this example, users may only be allowed to create site recipe using routings of type "Site." A practical use of this would be to prevent the user from creating a "Master" Recipe using a Routing for which no actual resources are specified. Also, the ability to specify the hierarchy and interdependence between recipe types may be provided.

This allows embodiments of the present invention to control the generation of recipes in a controlled manner pre-determined by the enterprise. For example, an enterprise implementing the three types of recipes as described by ISA S88.01 namely General, Site and Master recipes would setup the type dependencies so that embodiments of the present invention may not allow the creation of a Site recipe from a Master recipe.

Figure 12:
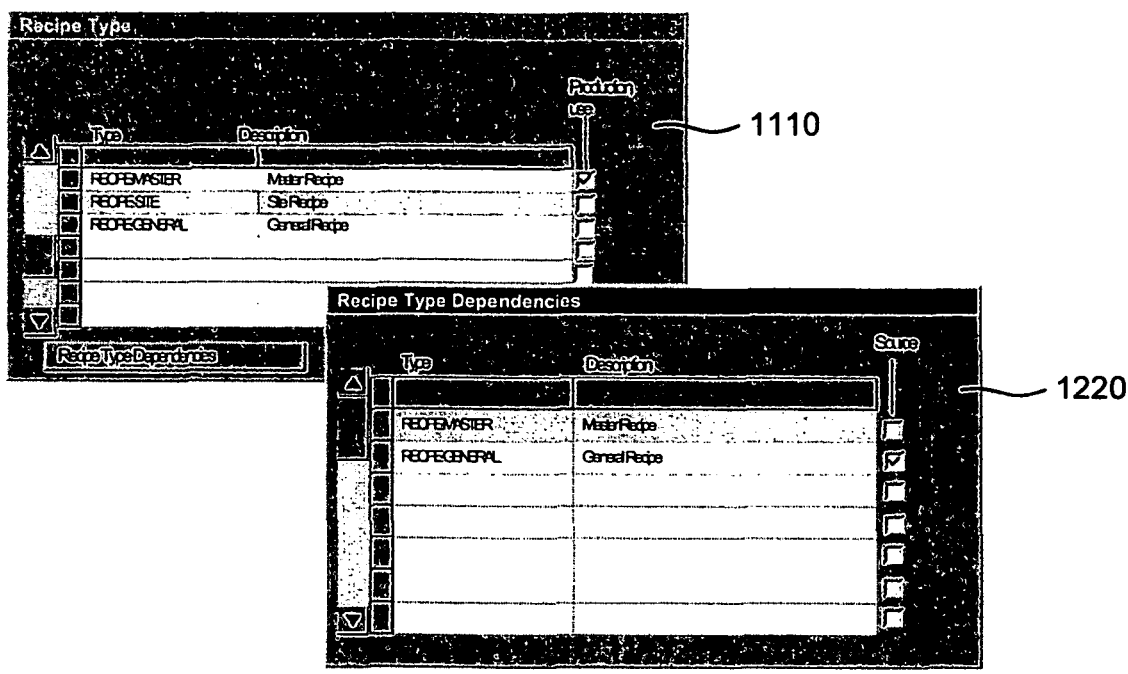
FIG. 12 depicts a recipe type dependencies maintenance window, according to an embodiment of the present invention.

FIG. 12 depicts a recipe type dependencies maintenance display 1200, according to an embodiment of the present invention. Display 1200 may include recipe type dependencies window 1220 which allows a user to assign an allowable recipe type to a selected recipe.

As shown in FIG. 12, a recipe of type "Site" may only be generated from a recipe of type "General". The flexibility of this architecture accommodates ISA S88.01 standards that advocate the use of three types of recipes: General Recipes, Site Recipes and Master Recipes, as well as the Standardization Association for Measurement and Control in Process Industries (NAMUR) recommendations to work with two generations of recipes, Source Recipes and Basis Recipes.

Figure 14:
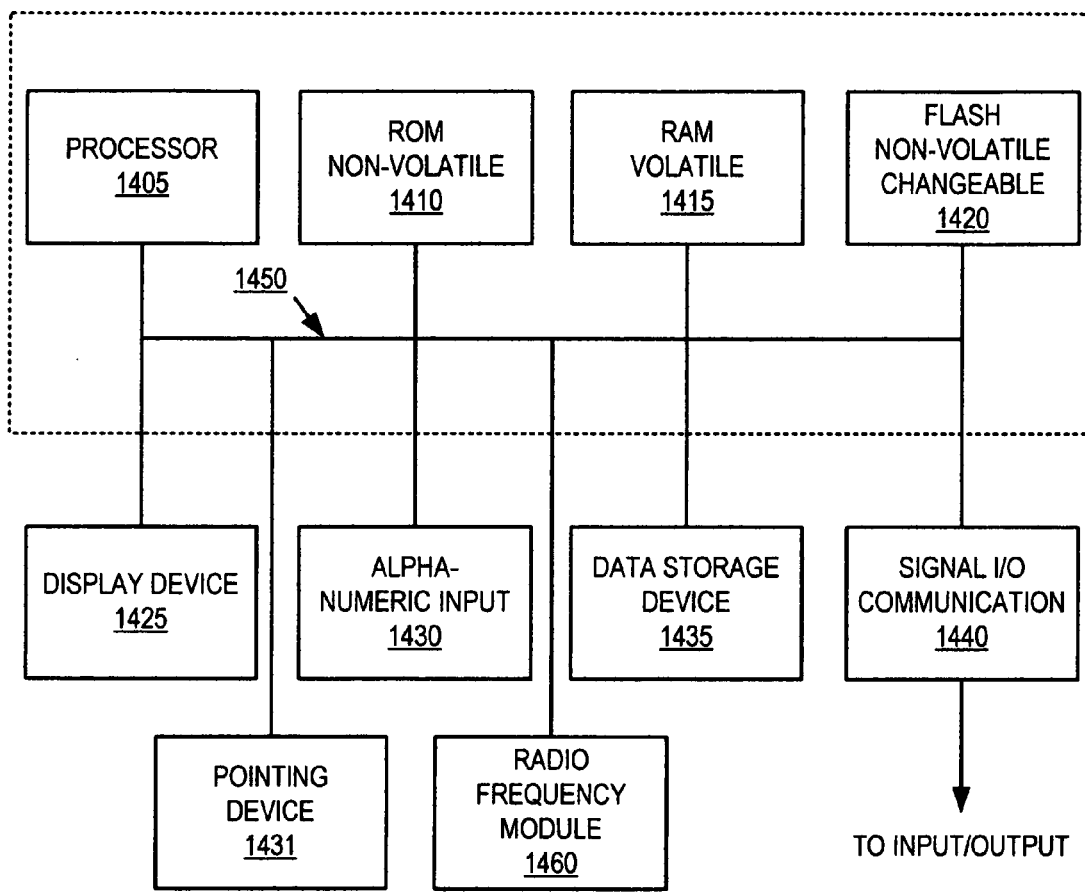
FIG. 14 illustrates circuitry of a computer system, which may form a platform for the implementation of embodiments of the present invention.

FIG. 14 illustrates circuitry of computer system 1400, which may form a platform for the implementation of embodiments of the present invention. Computer system 1400 includes an address/data bus 1450 for communicating information, a central processor 1405 functionally coupled with the bus for processing information and instructions, a volatile memory 1415 (e.g., random access memory RAM) coupled with the bus 1450 for storing information and instructions for the central processor 1405 and a non-volatile memory 1410 (e.g., read only memory ROM) coupled with the bus 1450 for storing static information and instructions for the processor 1405. Computer system 1400 also optionally includes a changeable, non-volatile memory 1420 (e.g., flash) for storing information and instructions for the central processor 1405, which can be updated after the manufacture of system 1400.

Computer system 1400 also optionally includes a data storage device 1435 (e.g., a rotating magnetic disk) coupled with the bus 1450 for storing information and instructions.

Also included in computer system 1400 of FIG. 14 is an optional alphanumeric input device 1430. Device 1430 can communicate information and command selections to the central processor 1400. Device 1430 may take the window of a touch sensitive digitizer panel or typewriter-style keyboard.

Computer system 1400 optionally includes a pointing device 1431, for example a mouse. Pointing device 1431 may be used to identify items on display device 1425, or regions of display device 1425. It is appreciated that other well-known forms of pointing devices including without limitation digitizer panels (both separate and integrated with display device 1425), track balls, light pens, RF proximity detectors and head position reading devices are well-suited to embodiments of the present invention.

Display device 1425 utilized with the computer system 1400 may be a liquid crystal display (LCD) device, cathode ray tube (CRT), field emission device (FED, also called flat panel CRT), light emitting diode (LED), plasma display device, electro-luminescent display, electronic paper or other display device suitable for creating graphic images and alphanumeric characters recognizable to the user. Optional signal input/output communication device 1440 is also coupled to bus 1450.

System 1400 optionally includes a radio frequency module 1460, which may implement a variety of wireless protocols, for example IEEE 802.11 or Bluetooth.

The preferred embodiment of the present invention, a graphical user interface for navigation, viewing and maintenance of recipes, is thus described. While the present invention has been described in particular embodiments, it should be appreciated that the present invention should not be construed as limited by such embodiments, but rather construed according to the below claims.

What is claimed is:

1. A computer implemented graphical user interface comprising:
    a first window for displaying selectable information in a hierarchical list format comprising recipe names and recipe contents, wherein said recipe contents comprise information to uniquely define manufacturing requirements for a specific product;
    a second window for displaying summary information regarding a selected recipe of said first window, said second window comprising a first button; and
    a third window displayed in response to activation of said first button and comprising detail information regarding said selected recipe of said first window, said third window comprising a plurality of display portions for editing routing and formula contents of said selected recipe.

2. A graphical user interface as described in claim 1 wherein said hierarchical list format is a tree structure comprising: project names; organization names; said recipe names; formula names; and routing names.

3. A graphical user interface as described in claim 2 wherein said tree structure further comprises: laboratory name; product name; and owner name.

4. A graphical user interface as described in claim 1 wherein said plurality of display portions comprise a routing editor window comprising line items, for display and editing, said line items representing operations of said routing contents of said selected recipe.

5. A graphical user interface as described in claim 4 wherein said routing editor window is tab activated.

6. A graphical user interface as described in claim 4 wherein each of said line items comprise an operation name and a repeat quantity.

7. A graphical user interface as described in claim 4 wherein said routing editor window further comprises a second button that, when activated, displays a formula window comprising formula contents corresponding to a selected line item of said routing editor window, said formula contents for display and editing.

8. A graphical user interface as described in claim 4 wherein said plurality of display portions further comprise a throughput window comprising throughput information for line items of said routing editor window.

9. A graphical user interface as described in claim 8 wherein said throughput window is tab activated.

10. A graphical user interface as described in claim 1 wherein said plurality of display portions comprise a routing editor window comprising a graphical flow diagram representing operations of said routing contents of said selected recipe.

11. A graphical user interface as described in claim 1 wherein said plurality of display portions comprise a header display portion comprising: hierarchical organization information; a name of said selected recipe; an associated routing name; and an associated formula name.

12. A graphical user interface as described in claim 1 further comprising:
    a search tool operable to enable a search function to search for recipes.

13. A graphical user interface as described in claim 1 further comprising:
    a right mouse menu displayed in response to activating the right button on a pointing device, wherein said menu comprises: a contextual menu that gives access to standard functions; and specific options based on said selected recipe.

14. A graphical user interface as described in claim 1 further comprising:
    a recipe creation window, wherein said recipe creation window is operable to edit product number and product quantity.

15. A graphical user interface as described in claim 1 further comprising:
    a recipe quantity window, wherein said recipe step quantity window is operable to edit items comprising: recipe description; recipe type; activity factor; and capacity.

16. A graphical user interface as described in claim 1 further comprising:
    a throughput editor window, wherein said throughput editor window is operable to edit line items relating to resources defined for throughput.

17. A graphical user interface as described in claim 1 further comprising:
    a routing details window, wherein said routing details window is operable to edit detailed information on a routing.

18. A graphical user interface as described in claim 1 further comprising:
    a recipe validity rules selection window, wherein said recipe validity rules selection window is operable to edit validity rules.

19. A graphical user interface as described in claim 1 further comprising:
    a recipe validity rules maintenance window, wherein said window is operable to edit formula use, min/max quantity and from/to date.

20. A graphical user interface as described in claim 1 further comprising:
    a recipe type maintenance window, wherein said window is operable to edit routing type associations.

21. A graphical user interface as described in claim 1 further comprising:
    a formula components window, wherein said formula components window is operable to edit formula components, said formula components comprising: product name; and product quantity.

22. A computer implemented graphical user interface comprising:
    a list window for displaying selectable information in a hierarchical list format comprising recipe names and recipe contents of recipes wherein said recipe contents comprise information to uniquely define manufacturing requirements for a specific product; and
    a detail window displayed in response to activation of a first button and for displaying detail information regarding a selected recipe of said list window, said detail window comprising a plurality of windows for editing routing and formula contents of said selected recipe, said plurality of windows comprising:
    a header window comprising: a name of said selected recipe; an associated routing name; and an associated formula name; and
    a routing editor window comprising line items representing operations of said routing contents.

23. A graphical user interface as described in claim 22 wherein said hierarchical list format is a tree structure comprising: project names; organization names; said recipe names; formula names; and routing names.

24. A graphical user interface as described in claim 23 wherein said tree structure further comprises: laboratory name; product name; and owner name.

25. A graphical user interface as described in claim 22 wherein said routing editor window is tab activated.

26. A graphical user interface as described in claim 22 wherein each of said line items comprise an operation name and a repeat quantity.

27. A graphical user interface as described in claim 22 wherein said routing editor window further comprises a second button that, when activated, displays a formula window comprising formula contents of a selected line item of said routing editor window, said formula contents for display and editing.

28. A graphical user interface as described in claim 22 wherein said routing editor window further comprises as graphical flow diagram representing operations of said routing contents of said selected recipe.

29. A graphical user interface as described in claim 22 wherein said routing editor window further comprises a throughput window comprising throughput information for line items of said routing editor window.

30. A graphical user interface as described in claim 29 wherein said throughput window is tab activated.

31. A method for managing recipe information comprising:
selecting a selected recipe from a hierarchical list of a first window, said list comprising recipe names and recipe contents, wherein said recipe contents comprise information to uniquely define manufacturing requirements for a specific product;
in response to said selecting, displaying a second window comprising summary information regarding said selected recipe, said second window comprising a first button; and
displaying a third window in response to activation of said first button, said third window comprising detail information regarding said selected recipe, said third window comprising a plurality of display portions for editing routing and formula contents of said selected recipe.

32. A method as described in claim 31 wherein said hierarchical list format is a tree structure comprising: project names; organization names; said recipe names; formula names; and routing names.

33. A method as described in claim 32 wherein said tree structure further comprises: laboratory name; product name; and owner name.

34. A method as described in claim 32 further comprising displaying said routing contents of said selected recipe in a routing editor window comprising line items representing operations to be performed.

35. A method as described in claim 34 wherein said displaying said routing contents is triggered in response to activating a tab.

36. A method as described in claim 34 wherein each of said line items comprise an operation name and a repeat quantity.

37. A method as described in claim 34 further comprising displaying a formula window in response to activation of a second button, said formula window comprising formula contents of a selected line item of said routing editor window.

38. A method as described in claim 34 further comprising displaying a throughput window comprising throughput information for line items of said selected recipe.

39. A method as described in claim 38 wherein said displaying said throughput window is triggered in response to activating a tab.

40. A method as described in claim 31 further comprising displaying a graphical flow diagram representing operations of said routing contents of said selected recipe.

41. A method as described in claim 31 further comprising displaying a fourth window comprising: hierarchical organization information; a name of said selected recipe; an associated routing name; and an associated formula name.

42. A system comprising:
a processor coupled to a bus;
a display coupled to said bus, for displaying graphical text and images to a user; and
a memory coupled to said bus and wherein said memory contains instructions that when executed implement a method for managing recipe information, wherein said recipe information comprises information to uniquely define manufacturing requirements for a specific product, said method comprising the steps of:
selecting a selected recipe from a displayed hierarchical list of a first window, said list comprising recipe names and recipe contents;
in response to said selecting, displaying a second window comprising summary information regarding said selected recipe, said second window comprising a first button; and
displaying a third window in response to activation of said first button, said third window comprising detail information regarding said selected recipe, said third window comprising a plurality of display portions for editing routing and formula contents of said selected recipe.

* * * * *

UNITED STATES PATENT AND TRADEMARK OFFICE
CERTIFICATE OF CORRECTION

| | | |
|---|---|---|
| PATENT NO. | : 7,065,714 B1 | Page 1 of 1 |
| APPLICATION NO. | : 09/976806 | |
| DATED | : June 20, 2006 | |
| INVENTOR(S) | : Karen Theel et al. | |

It is certified that error appears in the above-identified patent and that said Letters Patent is hereby corrected as shown below:

Claim 22, Column 16, Line 50, delete "of recipes"

Signed and Sealed this
Third Day of July, 2012

David J. Kappos
*Director of the United States Patent and Trademark Office*